W. X. BRUNS.
REPAIR FOR TUBING.
APPLICATION FILED FEB. 17, 1916.

1,204,244.

Patented Nov. 7, 1916.

William X. Bruns
INVENTOR.
BY
ATTORNEYS.

UNITED STATES PATENT OFFICE.

WILLIAM X. BRUNS, OF CHICAGO, ILLINOIS.

REPAIR FOR TUBING.

1,204,244.　　　　Specification of Letters Patent.　　Patented Nov. 7, 1916.

Application filed February 17, 1916. Serial No. 78,889

*To all whom it may concern:*

Be it known that I, WILLIAM X. BRUNS, a citizen of the United States, residing at Chicago, in the county of Cook and State of Illinois, have invented certain new and useful Improvements in Repairs for Tubing, of which the following is a specification.

This invention relates to tubular housings for flexible shafts, and more particularly to that type of housings which inclose speedometer shafts.

The object of the invention is to provide a simple and efficient repair for a broken or distended housing, such repair being easily applicable and very durable.

With this object in view, reference is had to the accompanying drawing, in which—

Figure 1:
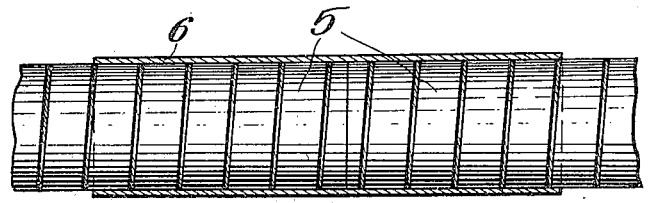
Figure 2:
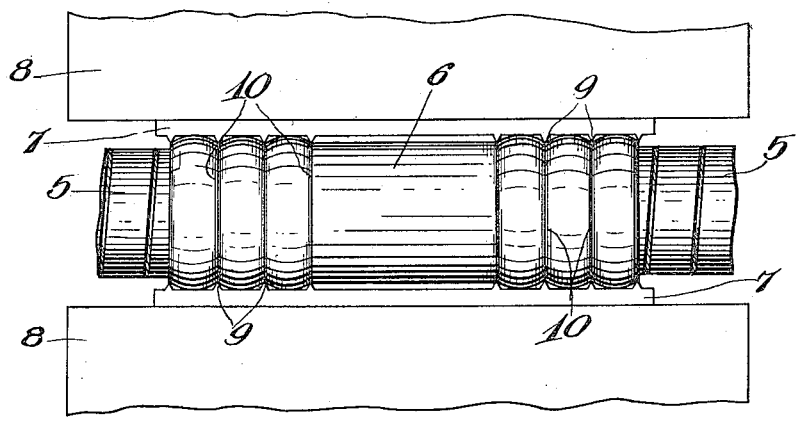

Figure 1 is a plan view, partly in section, of the repair, as first applied to the housing; and Fig. 2 is a plan view of the repair as completed, also showing a means used in making the repair.

Referring specifically to the drawing, 5 denotes two sections of a speedometer shaft housing, which are to be joined by the repair device. This type of shaft housing is usually formed of one or two ribbons of metal coiled spirally to result in a flexible tube.

The repair device, which is the subject matter of the present application, consists of a cylindrical tube 6 of pressed or drawn metal, the diameter of the tube being such as to enable the tube to be fitted snugly upon the housing 5.

To make the repair, the housing sections 5 have their meeting ends filed flat and are inserted into the repair tube 6 to meet, as shown in Fig. 1. The parts thus assembled are then lowered between the jaws 7 of a die supported by the jaws 8 of a vise. The die jaws 7 engage the tube 6 on opposite sides and have projecting ribs 9, which are ridged to present a sharp edge and are curved to conform to the sides of the tube 6. When the die jaws 7 are advanced by means of the vise, the ribs 9 will indent the tube 6, as shown at 10. With the tube 6 given one or two turns and the operation repeated, the indentations may be extended to cover the tube peripherally.

In effect the indentations 10 cause the tube 6 to grip the housing sections 5 tightly, and thus hold them together. Further, at places where the indentations register with the space between two coils of the housing, an additional fastening is formed, the inner rib formed by the indentation seating between the coils and preventing endwise movement of the housing sections.

While the repair has been described as completed by the vise and die arrangement illustrated, this is not necessarily the only means applicable to accomplish the required result. Any other means of producing the indentations 10 may be employed, and should be understood as within the scope of the invention.

I claim:—

A repair for spirally formed tubing comprising a sleeve of stiff material mounted on the tubing, the sleeve having a series of peripheral indentations forming ribs on its inner wall, the plane of each indentation being perpendicular to the axis of the tubing, and the ribs seating in the spaces between the spiral coils of the tubing at the intersection of said ribs with said spaces.

In testimony whereof I affix my signature in presence of two witnesses.

WILLIAM X. BRUNS.

Witnesses:
　NORMAN C. TOWNE,
　C. W. McLANE.

Copies of this patent may be obtained for five cents each, by addressing the "Commissioner of Patents, Washington, D. C."